United States Patent
Ramaswamy et al.

(10) Patent No.: US 6,574,769 B1
(45) Date of Patent: Jun. 3, 2003

(54) ENHANCED RANGE/GRACEFUL DEGRADATION FOR DIGITAL WIRELESS TELEPHONE SYSTEM

(75) Inventors: Kumar Ramaswamy, Indianapolis, IN (US); John Sidney Stewart, Indianapolis, IN (US); Paul Gothard Knutson, Indianapolis, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/581,192
(22) PCT Filed: Sep. 1, 1998
(86) PCT No.: PCT/US98/18105
§ 371 (c)(1),
(2), (4) Date: Nov. 15, 2000
(87) PCT Pub. No.: WO99/31838
PCT Pub. Date: Jun. 24, 1999

Related U.S. Application Data

(60) Provisional application No. 60/069,554, filed on Dec. 12, 1997.

(51) Int. Cl.[7] .............................................. H03M 13/00
(52) U.S. Cl. .................... 714/776; 714/762; 714/758
(58) Field of Search ................. 714/776, 762, 714/758, 746, 704

(56) References Cited

U.S. PATENT DOCUMENTS

| | | |
|---|---|---|
| 5,278,866 A | 1/1994 | Nonami |
| 5,745,532 A * | 4/1998 | Campana, Jr. |
| 5,751,773 A * | 5/1998 | Campana, Jr. |
| 5,926,500 A * | 7/1999 | Odenwalder |
| 6,418,131 B1 * | 7/2002 | Snelling et al. |

FOREIGN PATENT DOCUMENTS

| | | | |
|---|---|---|---|
| GB | 2291570 | 1/1996 | ............. H04L/1/12 |
| WO | 96/34461 | 10/1996 | ............. H04B/1/38 |

OTHER PUBLICATIONS

Kubota S et al., "Improved ADPCM Voice Signal Transmission Employing Click–Noise Detection Scheme for TDMA–TDD Personal Communication Systems" IEEE Transactionson Vehicular Technology, vol. 46, No. 1, Feb. 1997, pp. 108–113.

European Search Report dated Nov. 30, 1998.

* cited by examiner

Primary Examiner—Phung M. Chung
(74) Attorney, Agent, or Firm—Joseph S. Triopli; Harvey D. Fried; Joseph J. Kolodka

(57) ABSTRACT

A wireless telephone system comprising a base unit coupleable to one or more external telephone lines and having a base transceiver, and at least one wireless handset. The wireless handset has a handset transceiver for establishing a digital link with the base unit via the base transceiver over a wireless channel, wherein the handset and base unit communicate via the digital link by fixed-size audio packets comprising a plurality of audio data samples and a plurality of error correction bits. Qualities of the digital link are monitored to determine whether a change in error rate occurs. In response to the determination, a packet structure of subsequent audio packets is changed from a first packet structure to a second packet structure to change the relative number of bits devoted to audio data samples and to error correction bits.

20 Claims, 3 Drawing Sheets

US 6,574,769 B1

ENHANCED RANGE/GRACEFUL DEGRADATION FOR DIGITAL WIRELESS TELEPHONE SYSTEM

This application claims the benefit of No. 60/069,554, filed Dec. 12, 1997.

BACKGROUND OF THE INVENTION

1. Field of the Invention

The present invention relates to wireless telephone systems and, in particular, to multi-line wireless telephone systems having limited power for radio-frequency (RF) communications.

2. Description of the Related Art

The use of telephones and telephone systems, including wireless telephone systems, is widespread. In wireless telephone systems, a cordless or wireless telephone handset unit communicates via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are also in use in various situations, such as businesses with many telephone users. Such systems employ a handset that communicates with up to N handsets simultaneously, typically with digital communications schemes, such as time division multiple access (TDMA). It is desirable to implement the features of current private branch exchange (PBX) systems in a multi-line wireless telephone system.

Conventional multi-line wireless telephone systems, such as digital 900 MHz systems, typically must work within a specified bandwidth and modulation format, which thus constrains the maximum capacity of the radio-frequency (RF) channel used to transmit signals between the base unit and the operating or active handsets. Such systems are also typically power-limited, for example the 900 MHz RF channel cannot exceed 1 Watt in signal strength. Such systems therefore have range limits determined, in part, by the maximum power allowed.

Digital wireless telephone systems typically employ error-detection and correction schemes, such as FEC (forward error correction). Thus, some of the bits transmitted between handset and base unit carry audio and other forms of data, and some of the bits are devoted to error correction. For example, a given digital audio packet may comprise an audio packet header section (data), an audio data samples section (audio), and an FEC data section (error correction).

One problem that arises in digital wireless telephone systems is that, at the range limits, erratic or worse performance may occur. For example, at the range limits, signal strength for a constant- or limited-power signal falls off with distance, thereby degrading the quality of the received signal and increasing the number of bit errors. This can cause calls to be terminated and/or to adversely affect the quality of the audio and other data reconstructed by the relevant transceiver.

SUMMARY

A wireless telephone system comprises a base unit coupleable to one or more external telephone lines and has a base transceiver, and at least one wireless handset. The wireless handset has a handset transceiver for establishing a digital link with the base unit via the base transceiver over a wireless channel, wherein the handset and base unit communicate via the digital link by fixed-size audio packets comprising a plurality of audio data samples and a plurality of error correction bits. The digital link qualities are monitored to determine whether the handset is exceeding a range limit. In response to the determination, a packet structure of subsequent audio packets is changed from a first packet structure to a second packet structure to change the relative number of bits devoted to audio data samples and to error correction bits.

UK Patent Application No. 2 291 570 A, filed Jul. 21, 1995, published Jan. 24, 1996, describes an adaptive error correcting device, in which an error state of a communication channel is measured, and then one of a plurality of error encoding systems is selected depending on this measured error state. In general, an error encoding system is selected in this reference so that, when there is higher error measured, lower quality data is encoded and subjected to the error correction provided by a fixed number of error correction bits, so that only data of higher importance are protected from errors by the fixed number error correction bits, i.e. so that the available error correction bits apply to a smaller number of data bits so that the error correction for these data bits improves.

DESCRIPTION OF THE PREFERRED EMBODIMENT

Figure 1:
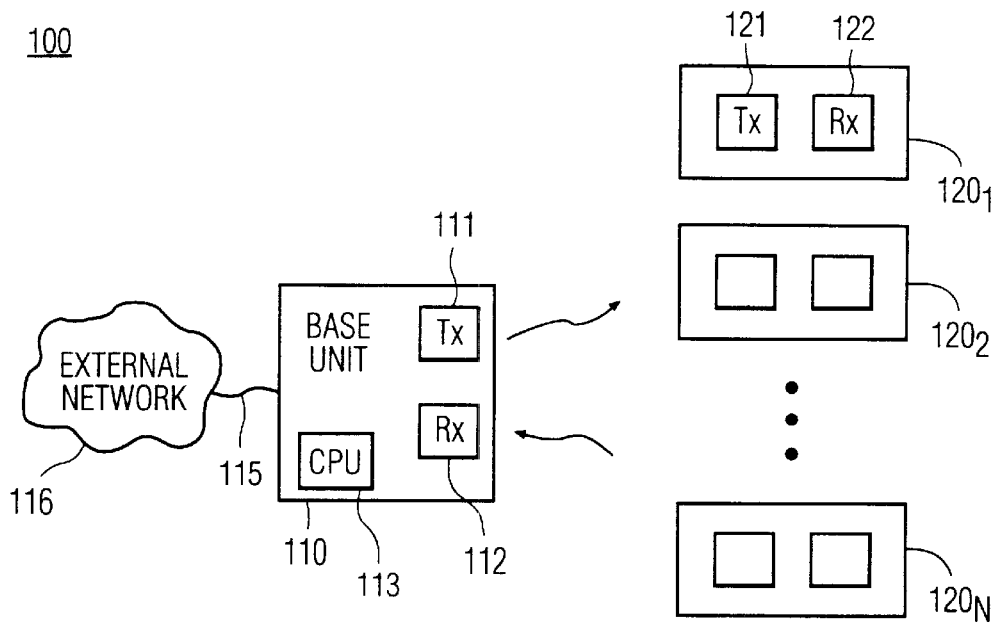
FIG. 1 is a block diagram of TDMA multi-line digital wireless telephone system, in accordance with an embodiment of the present invention.

Referring now to FIG. 1, there is shown a block diagram of spread spectrum TDMA multi-line digital wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1$, $120_2$, ... $120_N$. Each has a transmitter and receiver unit (transceiver), such as transmitter 121 and receiver 122 of handset $120_1$. Base unit 110 also has a controller/microprocessor 113 for controlling and monitoring the overall functions of the base unit 110. In one embodiment, receiver unit 112 comprises N separate logical receivers, and transmitter unit 111 comprises N separate logical transmitters, so that receiver and transmitter units 112 and 111 provide N total logical transceiver units, one for each of N wireless handsets. At any given time, M handsets ($0 \leq M \leq N$) are operating or active (i.e., in the process of conducting a telephone call). In one embodiment, system 100 employs a digital TDMA scheme, in which each operating handset only transmits or receives data during its own "time slice" or slot. System 100 thus provides a wireless network between the base station 110 and each handset $120_i$ ($1 \leq i \leq N$).

System 100 preferably employs block error coding to reduce error. In one embodiment, during a time slice, digitally compressed audio packets (such as ADPCM (adaptive differential pulse code modulation) samples) are transmitted, such as recommendation ITU-T G.721 or G.727 with a block code. This allows, for example, 16 ADPCM samples to be transmitted per audio packet. Block codes and ADPCM are preferred because of their low latency, which allows the wireless phone behavior to mimic that of a standard corded phone. Channel codes such as convolutional codes or turbo codes, or stronger source coding such as LPC (linear predictive coding), transform coding, or formant coding incur more delay, which makes the system less like the equivalent corded telephone.

In order to address the aforementioned range limit problem of digital wireless phone systems, in the present invention, a TDMA scheme is employed that monitors various qualities of the TDMA link, such as signal strength and/or bit error rates at a given receiver, to estimate the channel characteristics. Based on this estimate, the transmitter switches between lower bit rate, higher distortion source coding and comparatively high bit rate, low distortion source coding. The freed up bits in the former case are used to increase the error coding bits or "strength."

Thus, for example, as described in further detail below, if decreased signal strength below a certain threshold or increased bit error above a certain threshold is detected, the receiver may determine that the range limit is being or has been reached. At this point, the receiver alerts the relevant portion of the system to cause subsequent packets to be transmitted with the audio data portion at lower quality or more distortion to devote more bits to error correction, i.e. to increase error coding strength. When at a later time the handset moves within range, this can also be detected, and higher-quality audio data resumed with fewer bits devoted to error correction, since a weaker error coding can be tolerated when the handset is closer to the base.

Figure 2:
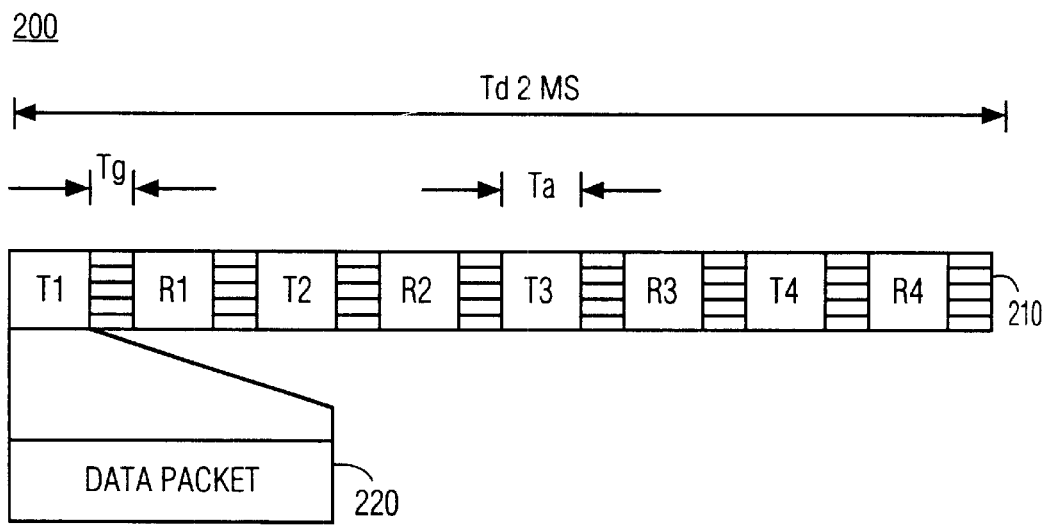
FIG. 2 is a schematic representation of the TDMA audio packet structure used in the digital wireless telephone system of FIG. 1, in accordance with an embodiment of the present invention.

Referring now to FIG. 2, there is shown a schematic representation of the TDMA audio packet structure 200 used in the digital wireless telephone system 100 of FIG. 1, in accordance with an embodiment of the present invention. Structure 200 comprises a 2 ms (Td) field 210 of digital data, which comprises eight audio packets, such as audio packet 220. Each audio packet is a set of audio data transmitted either to a given handset from the base unit or vice-versa, during a given time-slice in an overall "epoch" scheme, during which time no other handsets receive or transmit data over the system's data channel. Each packet is labeled Ti or Ri, to indicate whether it is being transmitted from the base unit 110 or received by the base unit 110, to or from a given handset 120$_i$.

In the present invention, during the 2 msec TDMA field cycle, voice data is exchanged in packets containing 16 samples of voice data. In one mode of operation of system 100, these samples are 4-bit ITU-T G.721 or G.727 ADPCM samples (i.e., a 32 Kbps ADPCM signal). By changing to G.727 3 or 2 bit ADPCM samples (24 or 16 Kbps ADPCM signals, respectively), an additional 16 or 32 bits are freed up for coding in each packet. The audio packet structure for a given handset may be changed, as described above, and as illustrated in further detail in FIG. 3.

Figure 3:
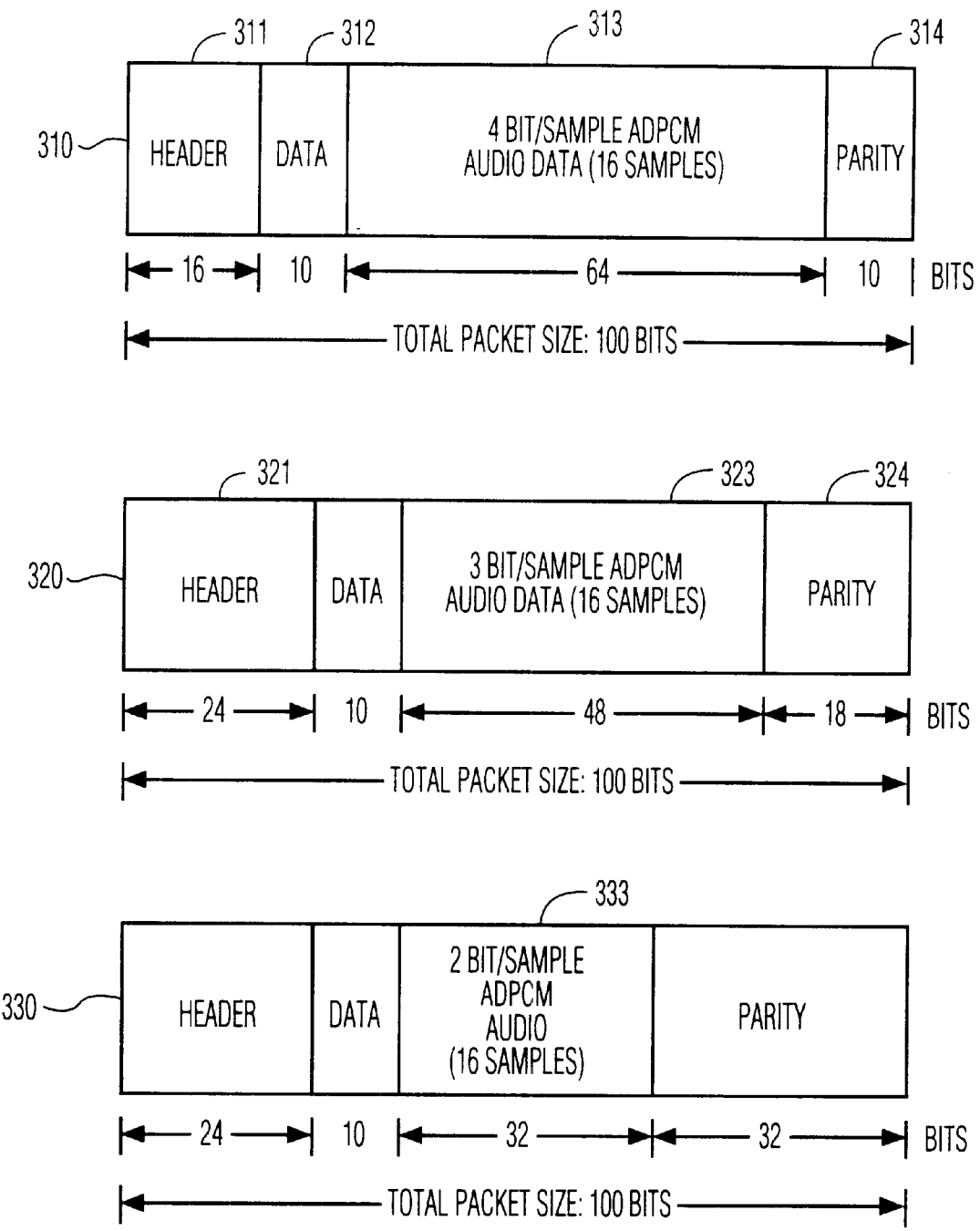
FIG. 3 is a schematic representation of alternative audio packet structures used in the TDMA packet structure of FIG. 2.

Referring now to FIG. 3, there is shown a schematic representation of alternative audio packet structures 310, 320, 330 used in the TDMA packet structure 200 of FIG. 2. As illustrated, each audio packet 220 comprises various sub-fields or sections, whether structured as structure 310, 320, or 330. However, in the present invention, bits are allocated differently among these fields in order to achieve better performance at range limits. For example, each audio packet 220 comprises audio packet header, a data section, and audio data (ADPCM samples) section, and a parity bit section that contains FEC data. The audio packet header typically contains information identifying the audio packet (such as the handset), the current place in the epoch, and the like. Each audio packet has a fixed size, for example 100 total bits.

In the present invention, therefore, each handset receives 16 ADPCM samples during each time slice of the epoch allocated for the handset to receive audio data; and transmits to the base unit 16 ADPCM samples during each time slice of the epoch allocated for the handset to transmit audio data. In the present invention, however, when a handset reaches detected range limits, the number of bits allocated to error coding is increased by lowering each sample's quality. ADPCM and related technical issues are described in detail in International Telecommunication Union (ITU), Recommendation G.727, (December 1990), "5-, 4-, 3- and 2-Bits Sample Embedded Adaptive Differential Pulse Code Modulation (ADPCM)," http://www.itu.ch.

In one embodiment, therefore, system 100 employs three levels of coding for encoding audio packets 220: high, medium, and low quality coding levels, inversely corresponding to the amount of bits devoted to error correction. These levels of coding correspond, respectively, to audio packet structures 310, 320, and 330. Structure 310, the default or standard structure, has the standard (highest) quality of audio data samples transmitted in field 313. In one embodiment, in all three possible packet structures, 16 ADPCM samples are transmitted per packet. However, in highest-quality packet structure 310, 64 of the 100 bits are allocated to ADPCM section 313, to allow for 16 high-quality 4-bit ADPCM samples to be transmitted. Structure 310 uses an (85,75) burst error correcting cyclic code, and has a payload of 74 bits (fields 312 and 313), one padding bit, and 10 error coding bits, which allows the code to correct a burst of 4 bit errors.

In medium-quality packet structure 320, 48 of the 100 bits are allocated to ADPCM section 323, to allow for 16 medium-quality 3-bit ADPCM samples to be transmitted. Medium-quality structure 320 uses a 2× interleaved (38,29) burst error correcting cyclic code, which can correct a burst of up to 8 errors. Structure 320 has a payload of 58 bits, with 26 coding bits. It will be appreciated that, since structure 320 uses 16 fewer audio data bits (64–48 or 74–58), structure 320 has 16 more bits devoted to error coding (26–10).

In low-quality packet structure 330, only 32 of the 100 bits are allocated to ADPCM section 333, to allow for 16 low-quality 2-bit ADPCM samples to be transmitted. Structure 330 uses a 4× interleaved (19,11) burst error correcting cyclic code, which can correct a burst of up to 16 errors. In the coding level that employs this packet structure, a payload of 42 bits is provided, with 32 coding bits and 2 padding bits.

The extra bits freed up for coding by switching to the medium- or low-quality levels are employed as extra coding bits and are distributed in a particular way in the changed audio structure. For example, 16 extra coding bits are distributed in audio packet structure 320 partly in parity section 324 and partly in header section 321.

In one embodiment, all interleaving is done over the payload and check bits of the packet, and packet headers are not included in the coding. As will be appreciated, interleaving is utilized in the lower coding levels (audio packet structures 320, 330), instead of simply increasing the length of parity section 314, to increase burst error correction capability. For structure 320, the 2× interleaved 3-bit sample structure, the even bits after the header go to one decoder, and the odd bits go to another. This decoder is preferably implemented as a time multiplexed decoder, or the data will be buffered and processed sequentially in a high speed decoder, since the data rate is quite slow compared to today's ASIC operating speeds.

Similarly, when employing the 4× interleaved, 2-bit sample structure 330, the received data is separated after the header into 4 streams. Data where the index is divisible by 4 is one stream; data where the remainder of said division is 1 is the second stream; where the remainder is 2 is the third stream; and where the remainder is 3 is the fourth stream. These interleaved streams are preferably decoded either sequentially by a fast decoder, or by a multiplexed decoder. In one embodiment, the single high speed decoder is preferred.

Figure 4:
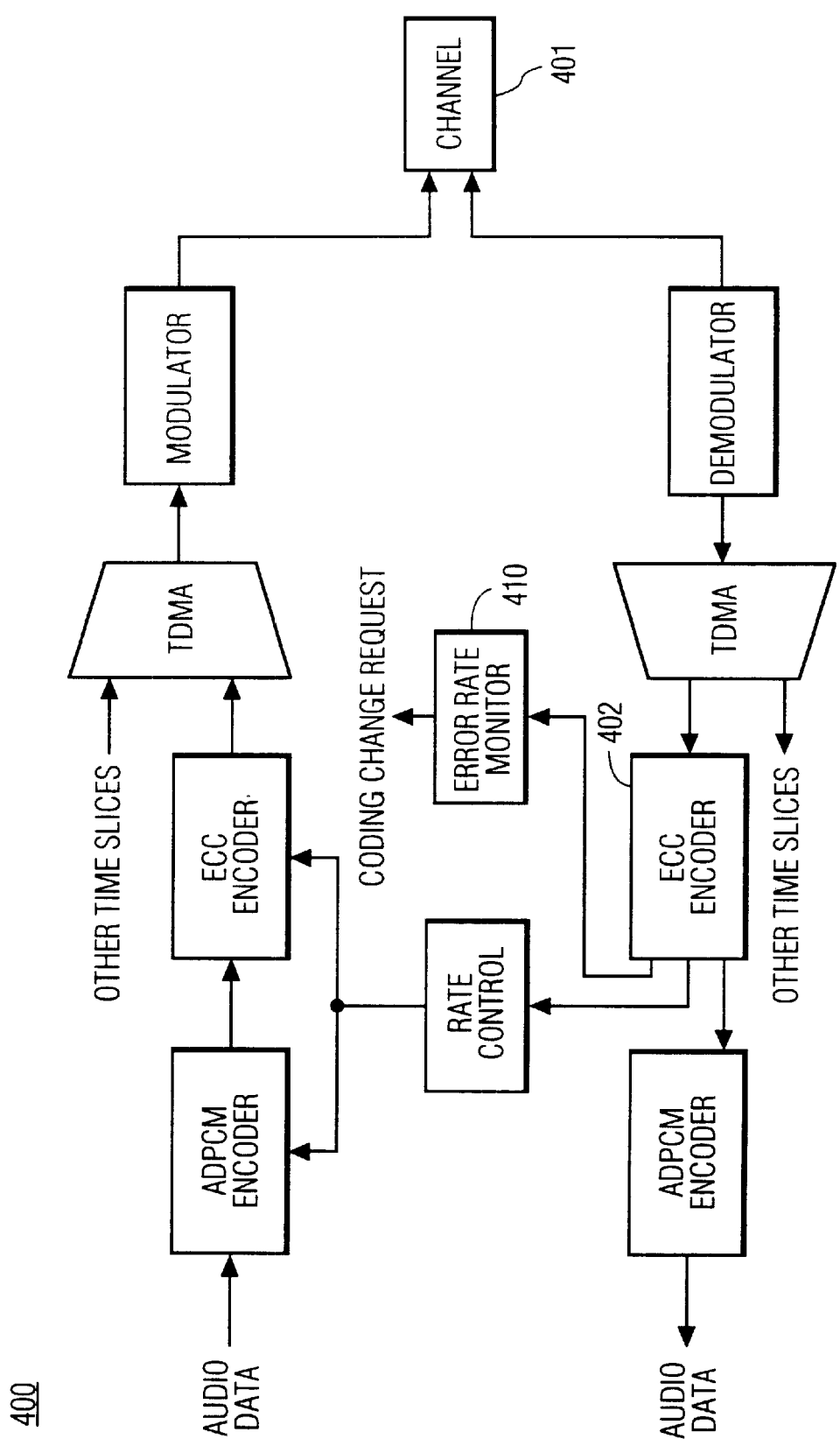
FIG. 4 is a block diagram illustrating the transceiver architecture of the base unit and handsets of the system of FIG. 1, in accordance with an embodiment of the present invention.

Referring now to FIG. 4, there is shown a block diagram illustrating the transceiver architecture 400 of the base unit 110 and/or handsets $120_i$ of system 100 of FIG. 1, in accordance with an embodiment of the present invention. In one embodiment, both base unit 110 and handsets $120_i$ implement transceiver architecture, so that either a handset $120_i$ or base unit 110 may request a changed coding level/audio packet structure. In an alternative embodiment, only one of handset $120_i$ and base unit 110, for a given base unit/handset pair, implements transceiver architecture 400.

As illustrated in FIG. 4, audio packet signals are received by a transceiver 400 (or either handset $120_i$ or base unit 110) via RF channel 401. After being decoded by error correction (ECC) decoder 402, an error rate monitor 410 monitors qualities of the received signal to determine the current bit error rate. (In an alternative embodiment, unit 410 or another unit monitors the signal strength.) When the bit error rate drops below (or rises above) a threshold level, error rate monitor 410 requests a change in the coding level, i.e. a change in the audio packet structure used to transmit subsequent audio packet structures.

Thus, the error rate increases on a given channel, the handset $120_i$ or base station 110 initiates requests a change to an increased coding level. The request to change coding levels is fed back to the remote transmitter, and is preferably acknowledged either by a header change or by additional control data. If this request is correctly received, therefore, the packet header will acknowledge the change to an increased coding level. In one embodiment, the packet headers are increased in length for structures 320, 330 to allow more time for the system to lock up, since the reception conditions are degraded when the increased coding levels are required.

As an example, if error rate monitor 410 is implemented in base unit 110 and detects that handset $120_i$ is reaching a first range limit, it notifies base unit 110 to change from packet structure 310 to 320. Base unit 110 then notifies handset $120_i$ to switch to this format, and also changes its own transmission format. Subsequently, therefore, both base unit 110 and handset $120_i$ encode audio packets to be transmitted, in accordance with audio packet structure 320. If a second range limit is then reached and detected, the third structure 330 may be adopted. When the handset comes back within the most recently exceeded range limit, a higher-quality structure (320 or 310) may be adopted once again. This allows range limits to be exceeded and addressed with more robust and stronger error correction, albeit at the cost of somewhat increase distortion or decreased audio quality. However, this is preferable to losing the connection altogether or incurring other artifacts that occur when uncorrectable errors increase.

Thus, the present invention comprises a multi-rate coding system for the digital wireless telephone link, which implements a variable code rate technique, in which error rate measurements taken at the receiver are used to decide whether to ask the transmitter to increase error coding. In the multi-rate coding system of the present invention, qualities of the TDMA link such as signal strength or bit error rate are monitored, and a switch from a high bit rate high quality voice coding scheme to a lower bit rate lower quality voice coding scheme is initiated. The error correction and detection coding, however is upgraded to use the bandwidth released by the lower bit rate coding method. This will reduce the number of bit errors and improves the overall channel integrity, reducing the likelihood of a hang-up or other serious loss of communications.

The present invention may be implemented in any digital audio transmission system, with or without the multi-line capability described above. The coding method described above is applicable in any digital modulation format. In an alternative embodiment, the coding method of the present invention may be used in wireless data communications, extending the range of the wireless office notebook, for example.

In a further alternative embodiment, the present invention may be applied in a system having a fixed bandwidth and where data distortion is unacceptable, such as a data modem system. In this embodiment, when increased bit errors are detected by the receiving modem, the receiving modem requests the transmitting modem to increase the relative proportion of parity or coding bits, at the cost of reduced data bit throughput, instead of at the cost of increased data distortion.

In the present invention, the coding and data rate are changed to increase the immunity to noise and burst errors. In alternative embodiments, packet structures other than those particularly described above may be used, as long as the packet structure allows the ability to support the different coding levels and data rates. Additionally, in another alternative embodiment, the present invention may be implemented as an application on top of a more primitive packet structure, provided the packet structure is robust enough. In further alternative embodiments, the structure protocol of the invention may be extended to support more than three coding levels.

In an alternative embodiment, the present invention is implemented in a limited-power digital wireless telephone system having only a single base unit and handset, which does not employ TDMA.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A wireless telephone system, comprising:
   (a) a base unit coupleable to one or more external telephone lines and having a base transceiver;

(b) at least one wireless handset having a handset transceiver for establishing a digital link with the base unit via the base transceiver over a wireless channel, characterized in that the digital link employs fixed size audio packets comprising a fixed number of audio data samples and a plurality of error correction bits each audio packet having one of a plurality of packet structures, the system further comprising:

(c) means for monitoring the digital link for determining a change in a bit error rate of audio packets received over the channel by one of the handset and the base unit; and (d) means for changing a packet structure of subsequent audio packets, in response to the determination, so that said subsequent audio packets are of the fixed size and have a smaller number of bits devoted to each of the fixed number of audio data samples and a larger number of bits devoted to error correction if said error rate has increased and vice-versa if said error rate has decreased.

2. The system of claim 1, wherein the data samples are adaptive differential pulse code modulation (ADPCM) samples, each ADPCM sample having a number of bits.

3. The system of claim 1, wherein the base unit comprises means (c) and (d).

4. The system of claim 1, wherein the handset is determined to exceed or fall within a range limit if the bit error rate exceeds or falls below a threshold, wherein the means (d) changes packet structures when the handset exceeds or comes back within a range limit.

5. The system of claim 1, further comprising:

(e) means for monitoring a signal strength received over the channel by one of the handset and the base unit, wherein the means (d) for changing a packet structure of subsequent audio packets changes said packet structure in response to at least one of the determination of means (c) and the determination of means (e).

6. The system of claim 1, wherein said plurality of packet structures comprises a high-quality packet structure having a highest number of bits per audio data sample and a lowest number of error correction bits, a medium-quality packet structure having an intermediate number of bits per audio data sample and an intermediate number of error correction bits, and a low-quality packet structure having a lowest number of bits per audio data sample and a highest number of error correction bits.

7. The system of claim 6, wherein said high-quality audio packet structure employs an burst error correcting cyclic code, said medium-quality audio packet structure employs a 2× interleaved burst error correcting cyclic code, and said low-quality audio packet structure employs a 4× interleaved burst error correcting cyclic code.

8. The system of claim 7, wherein said audio packets comprise an audio packet header field, a data field, an audio data field comprising fixed number of audio data samples, and a parity bit field comprising the plurality of error correction bits.

9. The system of claim 8, wherein, in said medium-quality and low-quality packet structures, the extra error correction bits are distributed partly in the parity bit field and partly in the header field to allow more time for said system to achieve lock on a given audio packet at the higher error rates associated with a digital link employing medium-quality or low-quality packet structure audio packets.

10. The system of claim 1, further comprising a plurality of wireless handsets including the handset, wherein:

the base (120) unit comprises a plurality of logical base transceivers; and each handset of the plurality of handsets has a handset transceiver for establishing a time-division multiple access (TDMA) link over a shared RF channel with the base unit via a corresponding logical base transceiver, in which each handset communicates during an exclusive time slice of a TDMA scheme that allocates time slices to active handsets.

11. A method for communicating between a base unit and a wireless handset of a wireless telephone system, wherein the base unit is coupleable to one or more external telephone lines and has a base transceiver, and the handset comprises a handset transceiver, the method comprising the steps of:

(a) establishing, between the handset transceiver and the base transceiver, a digital link over a wireless channel, characterized in that the digital link employs fixed size audio packets comprising a fixed number of audio data samples and a plurality of error correction bits, each audio packet having one of a plurality of packet structures, the method further comprising the steps of:

(b) monitoring the digital link to determine a change in a bit error rate of audio packets received over the channel by one of the handset and the base unit; and (c) changing a packet structure of subsequent audio packets, in response to the determination, so that said subsequent audio packets are of the fixed size and have a smaller number of bits devoted to each of the fixed number of audio data samples and a larger number of bits devoted to error correction if said error rate has increased and vice-versa if said error rate has decreased.

12. The method of claim 11, wherein step (b) comprises the step of determining that the handset is exceeding or falling within a range limit if the bit error rate exceeds or falls below a threshold, respectively, step (c) further comprising the step of changing the packet structure when the handset exceeds or comes back within a range limit in accordance with the determination of step (b).

13. The method of claim 11, wherein said plurality of packet structures comprises a high-quality packet structure having a highest number of bits per audio data sample and a lowest number of error correction bits, a medium-quality packet structure having an intermediate number of bits per audio data sample and an intermediate number of error correction bits, and a low-quality packet structure having a lowest number of bits per audio data sample and a highest number of error correction bits.

14. The method of claim 13, wherein said high-quality audio packet structure employs an burst error correcting cyclic code, said medium-quality audio packet structure employs a 2× interleaved burst error correcting cyclic code, and said low-quality audio packet structure employs a 4× interleaved burst error correcting cyclic code.

15. The method of claim 14, wherein said audio packets comprise an audio packet header field, a data field, an audio data field comprising fixed number of audio data samples, and a parity bit field comprising the plurality of error correction bits.

16. The method of claim 15, wherein, in said medium-quality and low-quality packet structures, the extra error correction bits are distributed partly in the parity bit field and partly in the header field to allow more time for said system to achieve lock on a given audio packet at the higher error rates associated with a digital link employing medium-quality or low-quality packet structure audio packets.

17. A first transceiver for communicating with a second transceiver, the first transceiver comprising:

(a) an encoder portion for encoding fixed-size audio data packet to be transmitted via a digital link established with the second transceiver via over a wireless channel, characterized in that the digital link employs fixed size audio packets comprising a fixed number of audio data samples and a plurality of error correction bits, each audio packet having one of a plurality of packet structures, the first transceiver further comprising:

(b) a decoder portion for decoding fixed-size audio data packet received from the second transceiver over the wireless channel; and (c) an error rate monitor coupled to the decoder portion for determining whether, based on a bit error rate determined in said received audio data packets, the first and second transceivers are exceeding or falling within a range limit relative to one another and for requesting that a packet structure of subsequent audio packets be changed, in response to the determination, so that said subsequent audio packets are of the fixed size and have a smaller number of bits devoted to each of the fixed number of audio data samples and a larger number of bits devoted to error correction if the first and second transceivers are exceeding a range limit and vice-versa if the first and second transceivers are falling within a range limit.

18. The first transceiver of claim 17, wherein said plurality of packet structures comprises a high-quality packet structure having a highest number of bits per audio data sample and a lowest number of error correction bits, a medium-quality packet structure having an intermediate number of bits per audio data sample and an intermediate number of error correction bits, and a low-quality packet structure having a lowest number of bits per audio data sample and a highest number of error correction bits, wherein said high-quality audio packet structure employs an burst error correcting cyclic code, said medium-quality audio packet structure employs a 2× interleaved burst error correcting cyclic code, and said low-quality audio packet structure employs a 4× interleaved burst error correcting cyclic code.

19. The first transceiver of claim 18, wherein said audio packets comprise an audio packet header field, a data field, an audio data field comprising fixed number of audio data samples, and a parity bit field comprising the plurality of error correction bits.

20. The first transceiver of claim 19, wherein, in said medium-quality and low-quality packet structures, the extra error correction bits are distributed partly in the parity bit field and partly in the header field to allow more time for said system to achieve lock on a given audio packet at the higher error rates associated with a digital link employing medium-quality or low-quality packet structure audio packets.

* * * * *